United States Patent
Stefanik et al.

(10) Patent No.: US 11,189,934 B2
(45) Date of Patent: Nov. 30, 2021

(54) RE-CONFIGURABLE DISTRIBUTED ANTENNA SYSTEM

(71) Applicant: Andrew Wireless Systems GmbH, Buchdorf (DE)

(72) Inventors: Joerg Stefanik, Donauworth (DE); Laura Macrelli, Cesena (IT)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 16/028,270

(22) Filed: Jul. 5, 2018

(65) Prior Publication Data
US 2019/0044249 A1    Feb. 7, 2019

Related U.S. Application Data

(60) Provisional application No. 62/540,642, filed on Aug. 3, 2017.

(51) Int. Cl.
*H01Q 19/12* (2006.01)
*H04B 1/40* (2015.01)
(Continued)

(52) U.S. Cl.
CPC ............. *H01Q 19/12* (2013.01); *H01Q 1/288* (2013.01); *H01Q 1/525* (2013.01); *H01Q 3/02* (2013.01);
(Continued)

(58) Field of Classification Search
CPC .......... H01Q 19/12; H01Q 1/288; H01Q 3/02; H01Q 3/20; H01Q 1/525; H04B 7/18515; H04B 1/40
See application file for complete search history.

(56) References Cited

U.S. PATENT DOCUMENTS 9,647,787 B1 *   5/2017   Schwartzman ... H04W 72/0413
2013/0135059 A1 *   5/2013   Duron ...................... H01P 1/10
                                                      333/101
(Continued)

OTHER PUBLICATIONS

International Searching Authority, "International Search Report and Written Opinion from PCT Application No. PCT/EP2018/000386 dated Nov. 14, 2018", From PCT Counterpart of U.S. Appl. No. 16/028,270, dated Nov. 14, 2018; pp. 1-13; Published in WO.

*Primary Examiner* — Walter J DiVito
(74) *Attorney, Agent, or Firm* — Fogg & Powers LLC

(57) ABSTRACT

A re-configurable distributed antenna system that includes a plurality of base transceiver stations and a plurality of remote antenna units is provided. The plurality of the remote antenna units are configured and arranged to provide communication services for a plurality of coverage zones. A signal router selectively routes signal communication paths between a plurality of base transceiver stations and the plurality of the remote antenna units. At least one memory is configured to store routing scenarios and distributed antenna system configurations associated with the stored routing scenarios. Moreover, at least one controller dynamically controls the signal router to selectively route the signal communication paths between the plurality of base transceiver stations and the plurality of remote antenna units based at least in part on a then current need of communication service capacity within the plurality of coverage zones and the stored coverage routing scenarios.

16 Claims, 6 Drawing Sheets

(51) Int. Cl.
*H01Q 1/52* (2006.01)
*H01Q 1/28* (2006.01)
*H01Q 3/02* (2006.01)
*H01Q 3/20* (2006.01)
*H04B 7/185* (2006.01)

(52) U.S. Cl.
CPC ................ *H01Q 3/20* (2013.01); *H04B 1/40* (2013.01); *H04B 7/18515* (2013.01)

(56) References Cited

U.S. PATENT DOCUMENTS

| | | |
|---|---|---|
| 2016/0135184 A1 | 5/2016 | Zavadsky et al. |
| 2016/0249392 A1 | 8/2016 | Chow |
| 2016/0329933 A1 | 11/2016 | Kummetz et al. |

\* cited by examiner

RE-CONFIGURABLE DISTRIBUTED ANTENNA SYSTEM

CROSS-REFERENCE TO RELATED APPLICATIONS

This Application claims priority to U.S. Provisional Application Ser. No. 62/540,642, same title herewith, filed on Aug. 3, 2017, which is incorporated in its entirety herein by reference.

BACKGROUND

Wireless cellular service providers use base stations to implement wireless communication links with user devices, such as mobile phones. In particular, a base station is typically in communication with one or more antennas that receive and transmit radio frequency signals to and from user devices. Each base station in turn is in communication with the service provider's core network. The coverage area of a base station is limited by a range of the transmitting and receiving power of its associated antennas. Moreover, the coverage provided by the transmitted radio waves is influenced by many other factors such as physical obstacles and interference. Hence, wireless coverage in buildings and stadiums has been traditionally poor. One system used by wireless cellular service providers to improve coverage provided by a base station or group of base stations in problem areas in a distributed antenna system (DAS). A distributed antenna system can be placed in or near areas that traditionally do not receive good wireless reception such as in or near buildings and stadiums.

A typical distributed antenna system comprises one or more master units and one or more remote units that are communicatively coupled to the master units. A distributed antenna system distributes radio frequency signals coming from a base station to the antennas (and ultimately, user devices) in the downlink and distributes radio frequency signals originating from user devices to the base station in the uplink. On their way through a distributed antenna system the radio frequency signals are attenuated by passive components (cables, combiner, splitter etc.) and amplified by active components like power amplifiers. Typically, a distributed antenna system is configured so that radio frequency signals received from the base station at a given input power level are radiated at each antenna of one or more remote units at a defined power output level and that signals received from user devices are received by the base station at a certain power level. To achieve this, attenuators and amplifiers are adjusted in the distributed antenna system accordingly. This process is called "leveling" of the associated signal path in the distributed antenna system. For enabling power control between the base stations and the remote units of the distributed antenna system, the uplink should have the same attenuation as the downlink or maintain some user defined offset from the downlink attenuation.

SUMMARY

The following summary is made by way of example and not by way of limitation. It is merely provided to aid the reader in understanding some of the aspects of the subject matter described. Embodiments provide a re-configurable distributed antenna system that uses stored predefined coverage scenario and associated distributed antenna system configurations to selectively manage communication assets in coverage zones.

In one embodiment, a re-configurable distributed antenna system is provided. The re-configurable distributed antenna system includes a plurality of base transceiver stations, a plurality of remote antenna units, a signal router, at least one memory and at least one controller. Each base transceiver station is in communication with a core network of a communication provider. The plurality of the remote antenna units are configured and arranged to provide communication services for a plurality of coverage zones. The signal router is configured and arranged to selectively route signal communication paths between the plurality of base transceiver stations and the plurality of the remote antenna units. The at least one memory is configured to store routing scenarios and distributed antenna system configuration associated with the stored routing scenarios. Moreover, the at least one controller is configured and arranged to dynamically control the signal router to selectively route the signal communication paths between the plurality of base transceiver stations and the plurality of remote antenna units based at least in part on a then current need of communication service capacity within the plurality of coverage zones and the stored coverage routing scenarios.

In another example embodiment, a method of operating a distributed antenna system is provided. The method includes dynamically switching signal communication paths between a plurality of base station transceivers and a plurality of remote antenna units and re-configuring the distributed antenna system with signal communication path properties associated with the then current signal communication paths that are stored in at least one memory.

In yet another embodiment, another method of operating a distributed antenna system is provided. The method includes providing a plurality of signal communication paths between a plurality of base transceiver stations and a plurality of remote antenna units. Each base transceiver station is in communication with a core network of a communication provider and each remote antenna unit provides communication services for a communication consumer coverage zone. A plurality of routing scenarios and distributed antenna system configurations are stored in at least one memory. Each distributed antenna system configuration enables communications through a signal communication path associated with a routing scenario. Upon detection of an event that indicates a need for enhanced communication service capacity at at least one coverage zone, a routing scenario is selected from the plurality of routing scenarios stored in the at least one memory to address the need for enhanced communication service capacity at the at least one coverage zone. At least one signal communication path is switched based on the selected routing scenario. The distributed antenna system is re-configured based on at least one distributed antenna system configuration stored in memory that is associated with the selected routing scenario.

BRIEF DESCRIPTION OF THE DRAWINGS

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

A distributed antenna system (DAS) is designed and optimized for a predefined coverage scenario. All DAS components are hard wired for this coverage requirement. This means that base transceiver station (BTS) signals are routed through to one or more selected sets of remote antenna units. A DAS system for example in a stadium might consist of a master unit with a number of connected BTS and remote units that are distributed together with antenna systems to build the coverage zones. Traditionally, the number of BTS in a DAS are designed to serve the maximum capacity for all areas in parallel even if it is unlikely that all the capacity is really needed in parallel. Unlike traditional BTS, embodiments provide a re-configurable DAS that dynamically adjusts wireless coverage to the coverage zones as needed.

Figure 1:
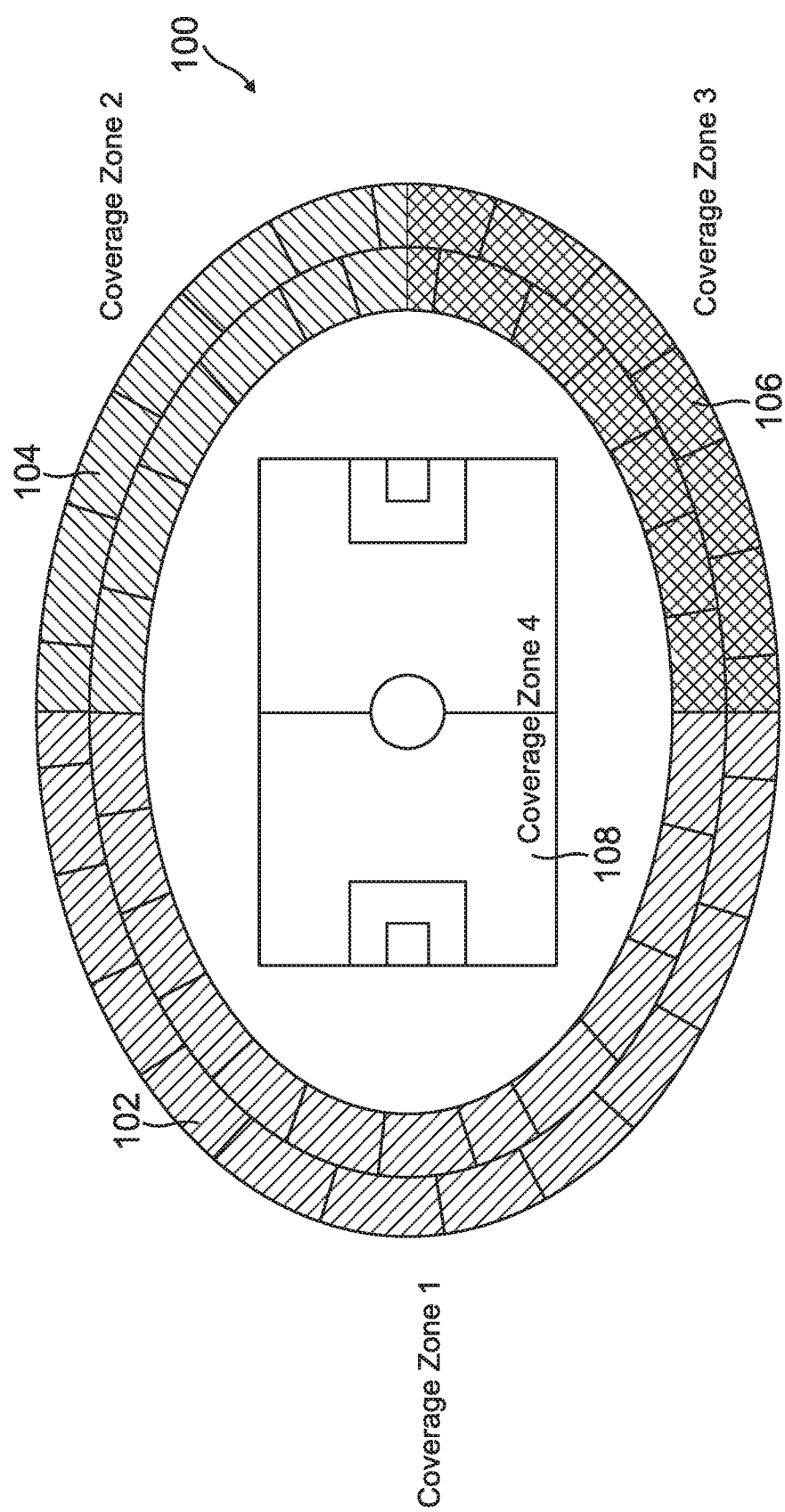
FIG. 1 is an illustration of coverage zones in an exemplary stadium according to one exemplary embodiment.

An example of coverage zones are illustrated in the exemplary stadium 100 of FIG. 1. As illustrated, the coverage zones in the example of FIG. 1 includes a first coverage zone 102, a second coverage zone 104, a third coverage zone 106 and a fourth coverage zone 108. Embodiments provide a re-configurable DAS that dynamically adjusts wireless coverage to the coverage zones as needed. For example, during a game, the most BTS capacity needs to be routed to coverage zones 102, 104 and 106 (seated areas) while less capacity is needed in coverage zone 108 (court area). While at a concert, significant capacity may be needed in coverage zone 108 (court area) and less in coverage zones 102, 104 and 106 (seated area). Moreover, before and after an event may require more capacity being needed in the outside areas close to the stadium such as, parking lots and public transportation areas.

Figure 2:
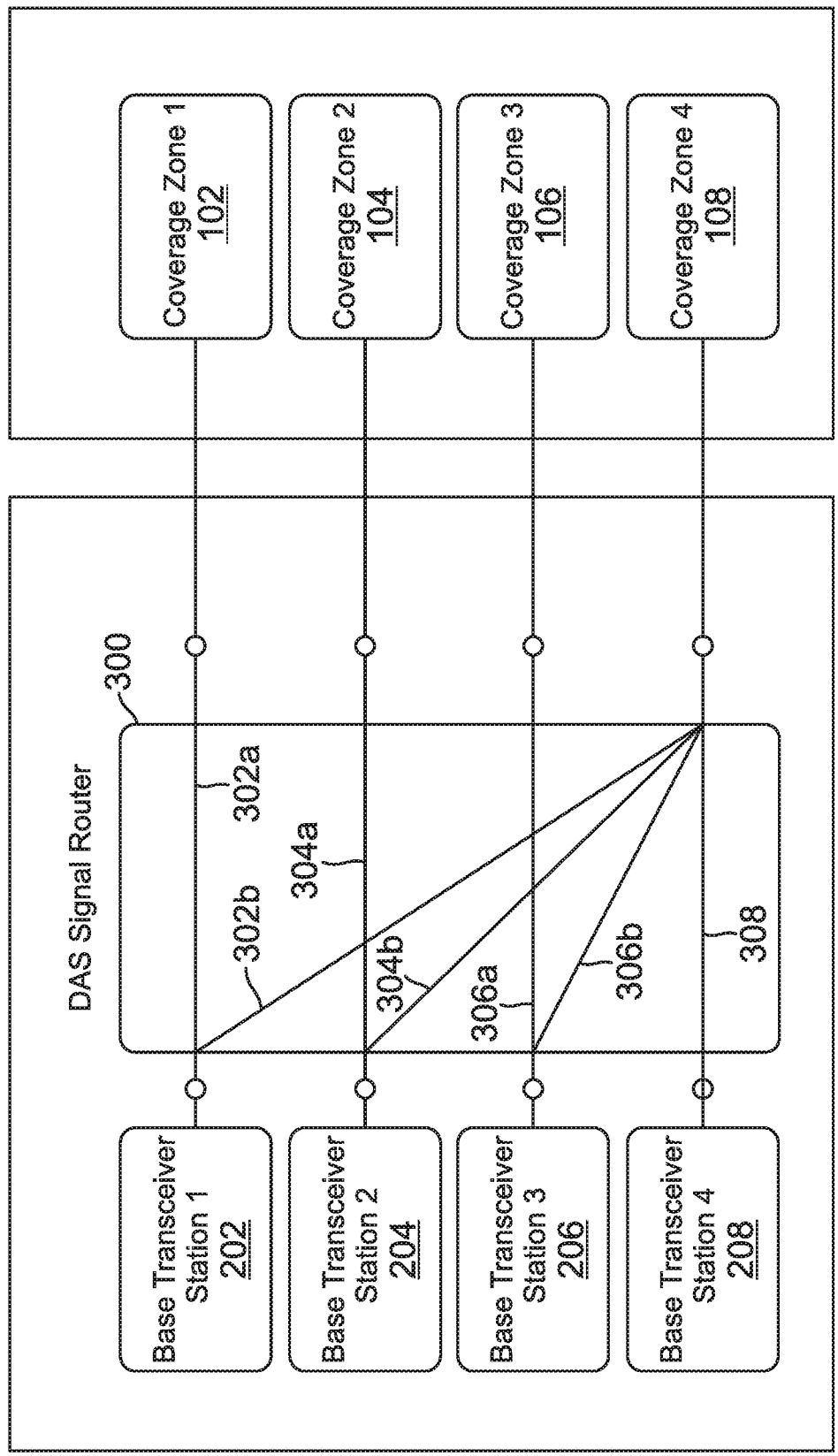
FIG. 2 is a block diagram of a distributed antenna system that includes a signal routing system according to one exemplary embodiment.

FIG. 2 illustrates an exemplary block diagram of a re-configurable DAS 200 with a signal router 300 that is used to provide communication services for coverage zones 102, 104, 106 and 108 of the exemplary stadium 100 of FIG. 1. In this example embodiment, the DAS 200 includes a first BTS 202, a second BTS 204, a third BTS 206 and a fourth BTS 208. Each BTS 202, 204, 206 and 208 is in communication with a core network of a communication provider. The signal router 300 provides communication paths between BTS 202, 204, 206 and 208 and remote antenna units (not shown in FIG. 2) that provides the communication services for select coverage zones 102, 104, 106 and 108. An initial setting of the signal router 300 of the DAS of the communication system 200 may provide a first communication path 302a for communication services for the first coverage zone 102 by the first BTS 202, a second communication path 304a for communication services for the second coverage zone 104 by the second BTS 204, a third communication path 306a for communication services for the third coverage zone 106 by the third BTS 206 and a fourth communication path 308 for communication services for the fourth coverage zone 108 by the fourth BTS 208.

If a situation arises, embodiments allow for the redirecting of assets (BTS) to provide additional communication service capacity where needed. For example, it may be determined that the fourth coverage zone 108 needs additional communication service capacity, one or more of the communication paths 302a, 304a and 306a to the first, second and third BTS 202, 204 and 206 may be redirected to add additional communication service capacity to the fourth coverage zone 108. For example, path 302a may be redirected to path 302b, path 304a may be redirected to path 304b and path 306a may be redirected to path 306b. A situation where the capacity of communication services for the fourth coverage zone 108 (which is a floor such as a basketball court as illustrated in FIG. 1) may need to be increased is right after a game when the fans, reporters and staff rush onto the floor. As discussed above, one or more BTS 202, 204 and 206 may be rerouted from covering the first coverage zone 102, second coverage zone 104 and the third coverage zone 106 (areas in the stands) to the floor (fourth coverage zone 108) after a game. Capacity of communications in the stands may be diminished at this point since the fans should be leaving the stadium.

Figure 3:
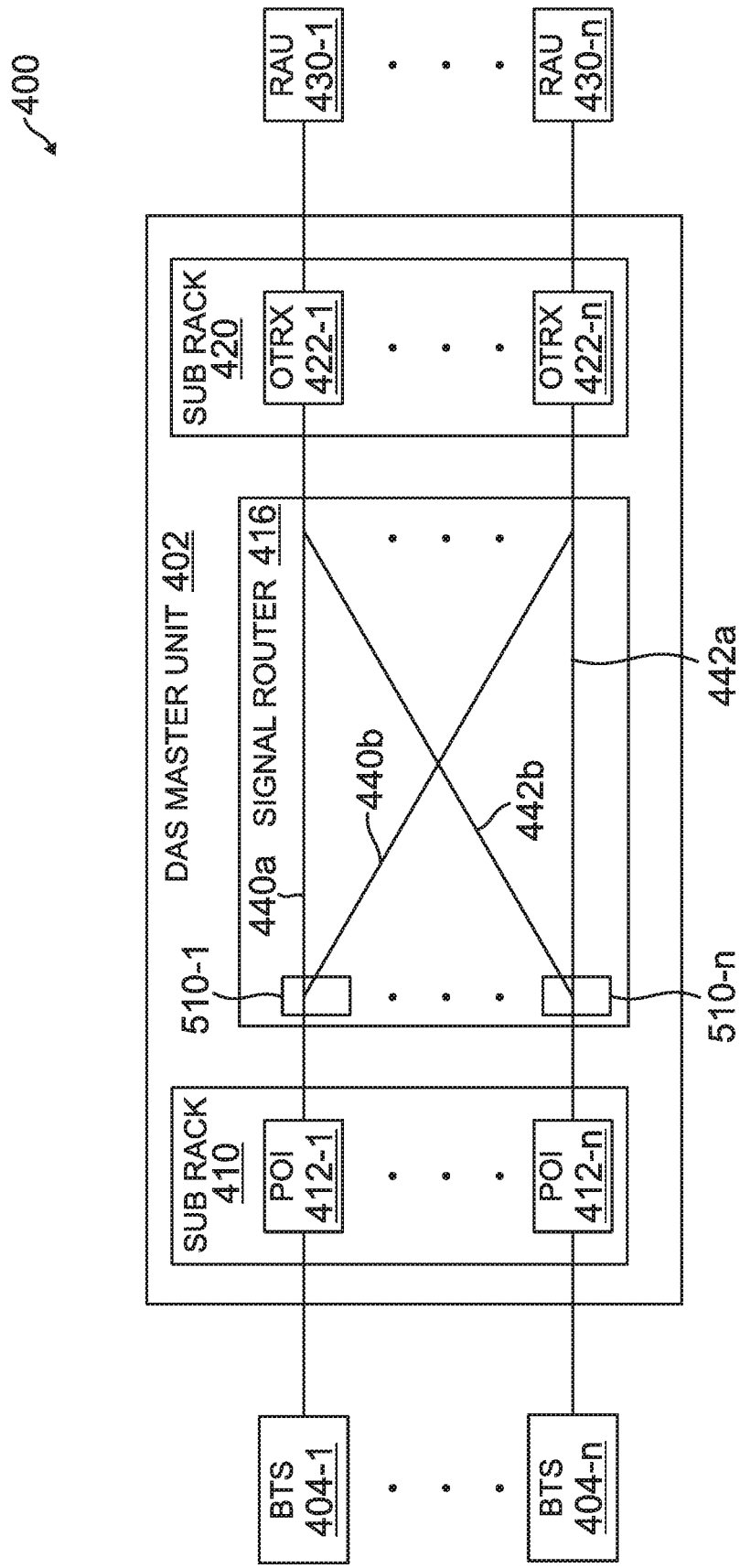
FIG. 3 is a block diagram of another distributed antenna system according to one exemplary embodiment.

Referring to FIG. 3, an illustration of another example of a simplified DAS 400 that provides flexibility in covering different coverage zones is provided. This example DAS 400 includes BTS 404-1 through BTS 404-n, a DAS master unit 402 and remote antenna units (RAU) 430-1 through RAU 430-n. Although the routing of signals are only shown between BTS 402-1 and 404-n and RAUs 430-1 and 430-n, for illustration purposes, it will be understood that the routing of signals between other BTS and RAU may be implemented. Hence, embodiments are not limited in the number of BTS and RAU used for communication services in coverage zones. The DAS master unit 402 in this example embodiment includes a first sub rack 410, a second sub rack 420 and a signal router 416. The first sub rack 410 includes intelligent point of interface (POI) 412-1 through 412-n. Each POI (generally designated as 412) is an integrated base transceiver station interface that combines several functions including, for example, at least base transceiver station conditioning, signal splitting and combing, monitoring, testing, remote monitoring, and automatic power leveling functions. In implementing the functions, each POI 412 may include, but is not limited to, a signal leveler, a signal amplifier, a signal attenuator, a signal splitter, a signal combiner, a receive-and-transmit signal combiner, a multiplexer, a test-tone generator, a radio frequency (RF) power detector, an RF signal tagging mechanism, and the like. Generally, a POI 412 can interface directly with RF sources such as, but not limited to, base stations, repeaters, or a group of RF sources. The second sub rack 420 includes transceivers 422-1 through 422-n. In an embodiment, at least one of the transceivers 422-1 through 422-n is an optical transceiver (OTRX). Communication signals are passed between POI 412-1 through 412-n and transceivers 422-1 through 422-n.

In this example embodiment of FIG. 3, the signal router 416 is illustrated as selectively providing signal communication paths 440a, 440b, 442a and 442b between POI 412-1 and POI 401-n of the first sub rack 410 and transceivers 422-1 and 422-n in the second sub rack 420. Moreover, for illustration purposes, the signal router 416 is illustrated as having a routing switch 510-1 that is associated with POI 412-1 and a routing switch 510-n that is associated with POI 412-n. The routing switches 510-1 through 510-n may be analog switches, RF relays and the like. With the use of the routing switches 510-1 through 510-n, the communication paths between POIs 412-1 and 421-n and transceivers 422-1 and 422-n can be changed as needed to communicatively couple any of the BTS 404-1 through 404-n to any of the RAU 430-1 through 430-n. For example, the first POI 412-1 is selectively in communication with either the first transceiver 422-1 or the second transceiver 422-n or both transceivers 422-1 and 422-n via communication paths 440a and 440b. Moreover, the second POI 412-n is selectively in communication with either the first transceiver 422-1 or the second transceiver 422-n or both transceivers 422-1 and 422-n via communication paths 442a and 442b. Although the signal router 416 is illustrated as residing as a separate component in the DAS master unit 402, components of the signal router may reside in different locations such as, but not limited to the first sub-rack 410 and the second sub-rack 420. As further illustrated in the example embodiment of FIG. 3, the first transmitter 422-1 is in communication with a first remote antenna unit (RAU) 430-1 and the second transceiver 422-n is in communication with a second RAU 430-n. The RAU 430-1 through 430-n provide communication services for the coverage zones discussed above.

In the simplified example of the DAS 400 in FIG. 3, signals in a downlink direction from the first BTS 404-1 are communicated to POI 412-1. From POI 412-1, the downlink direction signals are communicated through respective communication paths to transceivers 422-1 through 422-n. Then from the respective transceiver 422-1 through 422-n, the downlink direction signals are communicated to the respective RAUs 430-1 through 430-n where the signals are radiated from one or more antennas included in or coupled to the RAUs 430-1 through 430-n to user devices in the respective coverage zones. Moreover, signals in the downlink direction associated with BTS 404-n are communicated to POI 412-n. Similar to POI 412-1, from POI 412-n the downlink direction signals are communicated through respective communication paths to transceiver 422-1 and transceiver 422-n. Then from the respective transceiver 422-1 through 412-n, the downlink direction signals are communicated to the respective RAU 430-1 through 430-n where the signals are radiated from one or more antennas included in or coupled to the RAUs 430-1 through 430-n to user devices in the respective coverage zone. That is, in this example, the downlink signals from the BTS 404-1 through 404-n may be simulcast from all of the RAUs 430-1 through 430-n in the DAS 400 or just to selected RAUs.

Similarly, in the uplink direction, signals from user devices are received by one or more of the RAUs 430-1 through 430-n. Signals received by RAU 430-1 are communicated to transceiver 422-1. From transceiver 422-1 signals in the uplink direction are communicated to one or more POI 412-1 through POI-n. Signals received by RAU 430-n are communicated to transceiver 422-n. From transceiver 422-n, signals in the uplink direction are communicated to one or more POI 412-1 through 412-n. At POI 112-1, uplink signals intended for BTS 404-1 that were received at RAUs 430-1 and 430-n may be combined and the resulting combined uplink signals are communicated to the BTS 404-1. Likewise, at POI 412-n, uplink signals intended for BTS 104-n that were received at both RAUs 430-1 and 430-n are combined and the resulting combined uplink signals are communicated to BTS 404-n. In this simulcast example, uplink signals from all of the RAUs 430-1 and 430-n in the DAS 400 maybe combined to create the respective resulting uplink signal communicated to each BTS 404-1 and 404-n. It is to be understood, however, uplink signals from less than all of the RAUs 430-1 through 430-n in the DAS 400 can be combined to create the respective resulting uplink signal provided to one or more of the RF sources.

As discussed above, any number of POIs and transceivers can be used as part of a DAS 100 with many different signal communication paths between components of DAS 400. Also, for ease of explanation, only a single bi-directional communication link is shown between each transceiver 422-1 through 422-n and a respective RAU 430-1 through 430-n, it is to be understood that such link can be implemented using one or more cables or other communication media (including different types of cables or other communication media) and using one or more intermediary units (such as an expansion unit).

Figure 4:
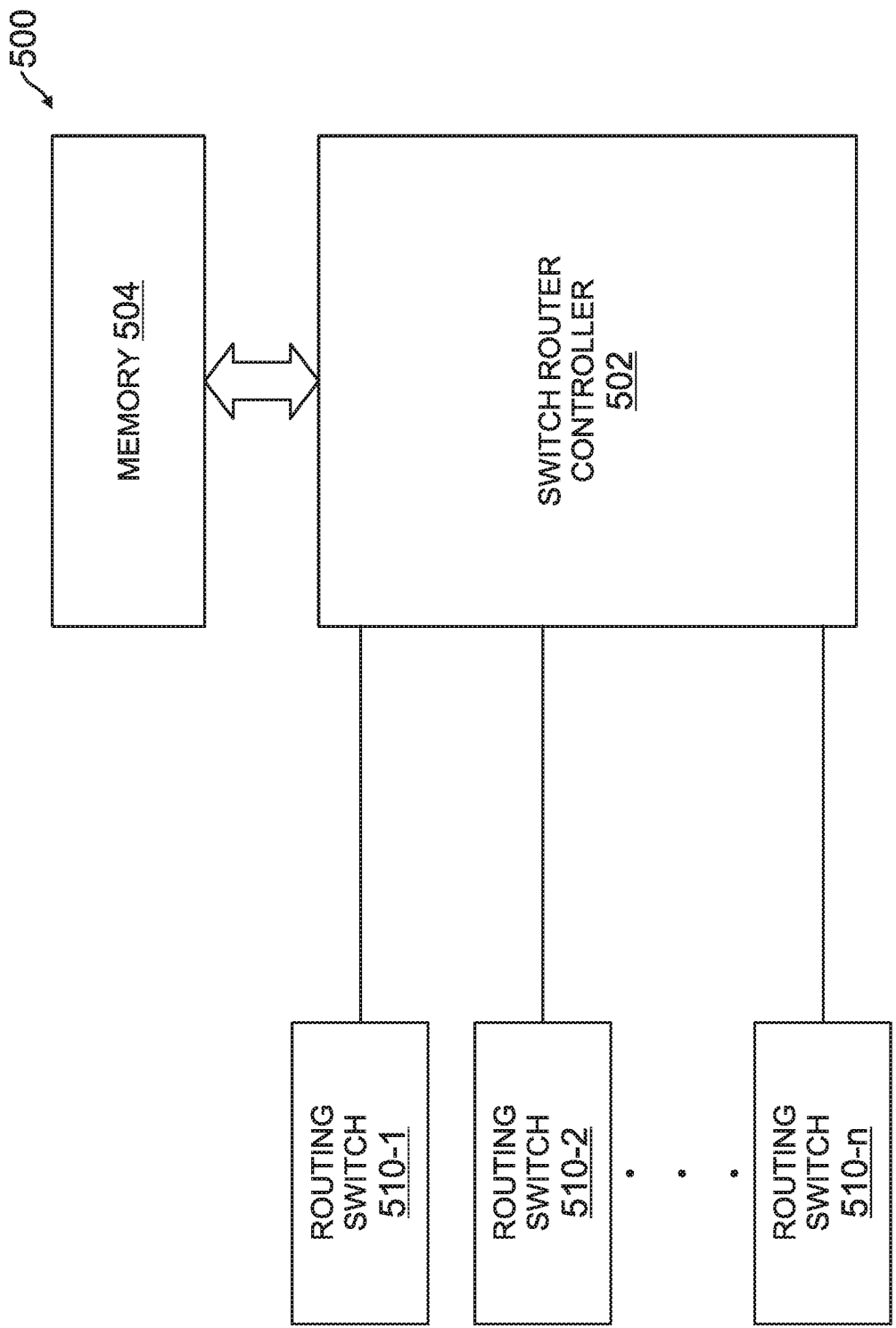
FIG. 4 is a block diagram of a control system according to one exemplary embodiment.

Referring to FIG. 4, a block diagram of a control system 500 of the signal router 416 in an exemplary embodiment is illustrated. The control system 500 includes a switch router controller 502 and memory 504. In general, the switch router controller 502, or controller, may include any one or more of a microprocessor, a digital signal processor (DSP), an application specific integrated circuit (ASIC), a field program gate array (FPGA), or equivalent discrete or integrated logic circuitry. In some example embodiments, controller 502 may include multiple components, such as any combination of one or more microprocessors, one or more controllers, one or more DSPs, one or more ASICs, one or more FPGAs, as well as other discrete or integrated logic circuitry. The functions attributed to controller 502 herein may be embodied as software, firmware, hardware or any combination thereof and may be implemented using software, firmware, hardware or any combination thereof that implements functions other just the leveling functions described here. Memory 504 may include a non-transitory storage medium that is used to store instructions for such software or firmware that, when executed by the controller 502, provide one or more functions of described here as being implemented by the controller 502. The instructions may be stored within the memory 504. Memory 504 may comprise storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium. The switch router controller 502 may be part of a controller of one of the POIs 112-1 through 112-n. In another embodiment, the controller 502 is a controller associated with the DAS master unit 402 as a whole. In still another embodiment, the controller 502 is part of a signal router that is remote to the DAS system 400.

The switch router controller 502 controls the operation of routing switches 510-1 through 510-n to selectively direct resources (BTS) to coverage zones. In embodiments, quick and effective switching is accomplished by storing several routing scenarios and DAS configurations in memory 504. Hence, both the routing scenarios and associated DAS configurations are stored in the memory 504. The DAS configurations are determined based off of signal communication path properties for each signal communication path used in a routing scenario. These properties may include properties relating to gain or attenuator settings, output power profile definitions for the remote units, analog or digital filtering, delay adaptions and the like. In one embodiment, these properties are also stored in the memory.

In an analog DAS embodiment, one important property is, for instance, the leveling parameters used to compensate for different tolerances and cable losses in different signal communication paths. Moreover, in one embodiment, re-configuring the DAS is done so that radio frequency signals received from a base transceiver station of the plurality of base transceiver stations associated with the then current signal communication paths at a given power level are radiated at each associated remote antenna unit at a select power output level and that signals received by each associate remote antenna unit are received by the associated base station transceiver at a select power level.

A controller, such as controller 502 automatically applies the then current DAS configurations to accommodate the signal path properties in processing communication signals. In one embodiment, the switching between signal communication paths is triggered manually. In yet another embodiment, the switching between signal communication paths is done on a predetermined schedule. In still another embodiment, the switching between signal communication paths is done automatically with customer defined trigger conditions. Further in other embodiments a combination of any of above three described events are used to initiate the switching between signal communication paths defined in a selected scenario.

Figure 5:
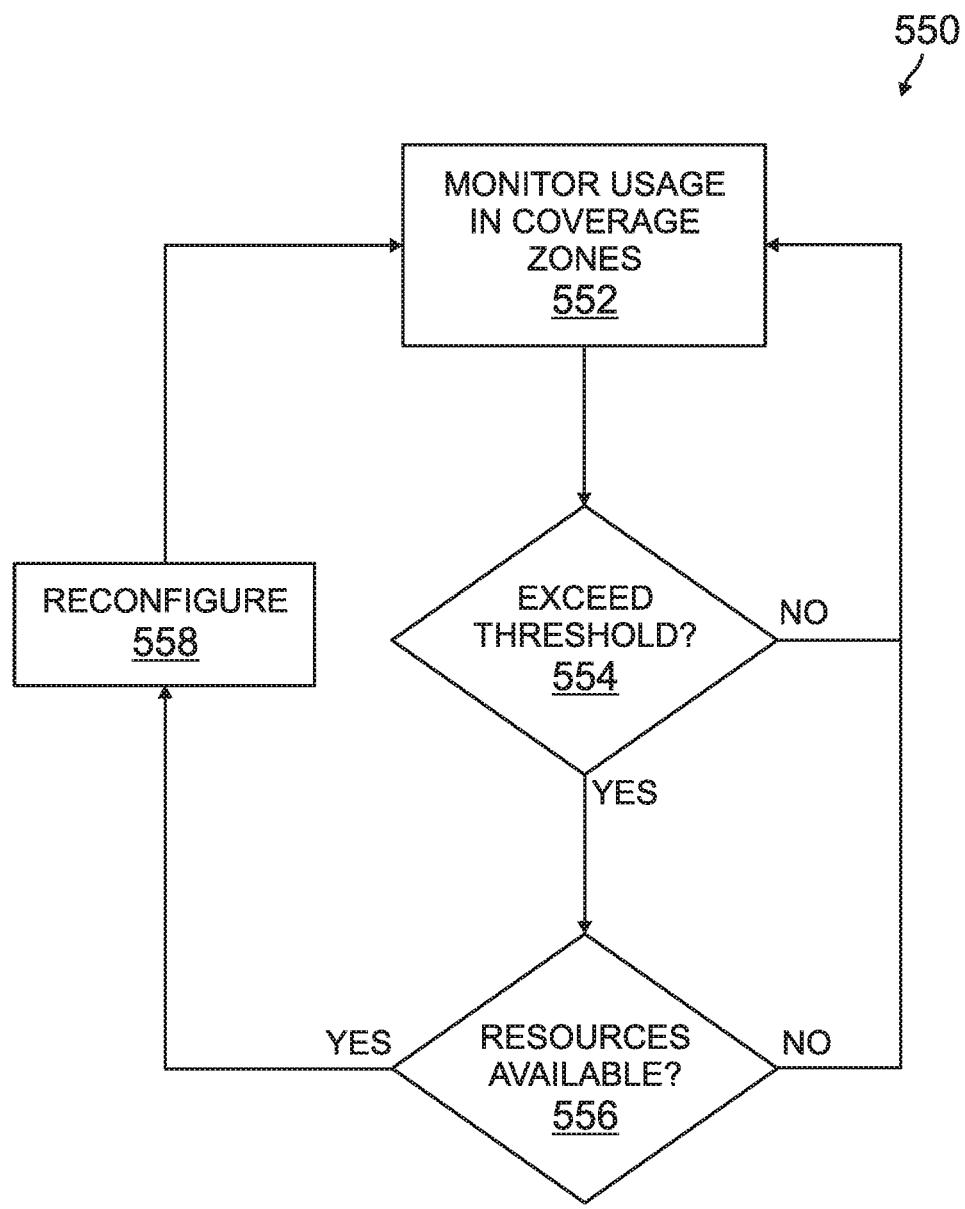
FIG. 5 illustrates an automatic trigger flow diagram according to one exemplary embodiment.

An example of an automatic trigger flow diagram 550 of an exemplary embodiment is illustrated in FIG. 5. The blocks of the automatic trigger flow diagram 550 have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner). In this example of an automatic trigger flow diagram 550, coverage zones are monitored for usage at block 552. Based on the monitoring at block 552, it is determined if usage at a coverage zone has exceeded a predetermined threshold at block 554. In another embodiment it is determined if the communication usage has merely reached the predetermined threshold. In the Example of FIG. 5, if the communication usage at the coverage zone has not exceeded the threshold, the process continues at block 552 monitoring communication usage in the coverage areas. If it is determined that a threshold usage in a coverage zone is exceeded at block 554, it is then determined if there are available resources (BTS) covering other coverage zones that can be redirected to the coverage zone where communication usage has exceeded the threshold. If there is not any resources available to redirect towards the coverage zone where usage has exceeded the threshold, the process continues monitoring at block 552 and the switching of signal communication paths does not occur. If, however, it is determined at block 556 that there are available resources that can be redirected to the coverage zone where communication usage has exceeded the threshold, these available resources (BTS) are redirected to provide additional communication services to the coverage zone where usage has exceeded the threshold at block 558. The process then continues at block 553 monitoring communication usage in the coverage zones.

Figure 6:
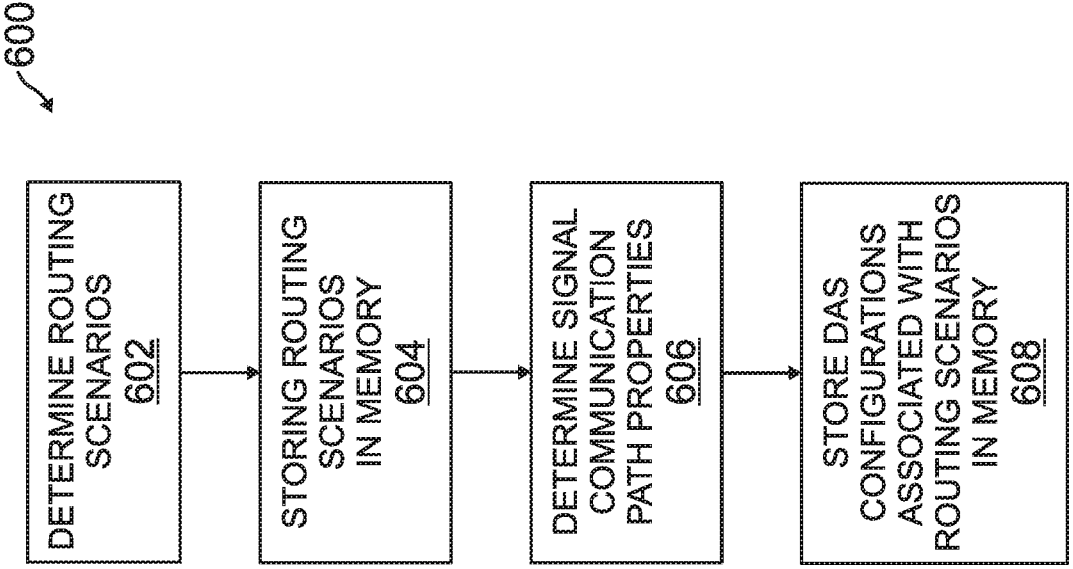
FIG. 6 illustrates a system setup flow diagram according to one exemplary embodiment.

An example of a system setup flow diagram 600 of an exemplary embodiment is illustrated in FIG. 6. The blocks of the system setup flow diagram 600 have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner). In the example embodiment of FIG. 6, routing scenarios are determined at block 602. Each routing scenario provides a different communication path configuration to change available communication service capacity to at least one coverage zone. The routing scenarios are stored in memory 504 at block 604. Signal communication path properties for each routing scenario is then determined at block 606. As discussed above, the properties may relate to gain settings, attenuation settings, output power profiles definitions for the remote antenna units, analog filtering, digital filtering, delay adaptions and other leveling parameters needed to ensure communications between base transceiver stations 404-1 through 404-n and remote antenna units 430-1 through 430-n. Based on the determined signal communication path properties, distributed antenna system configurations are associated with the routing scenarios and stored in the memory at block 608.

Figure 7:
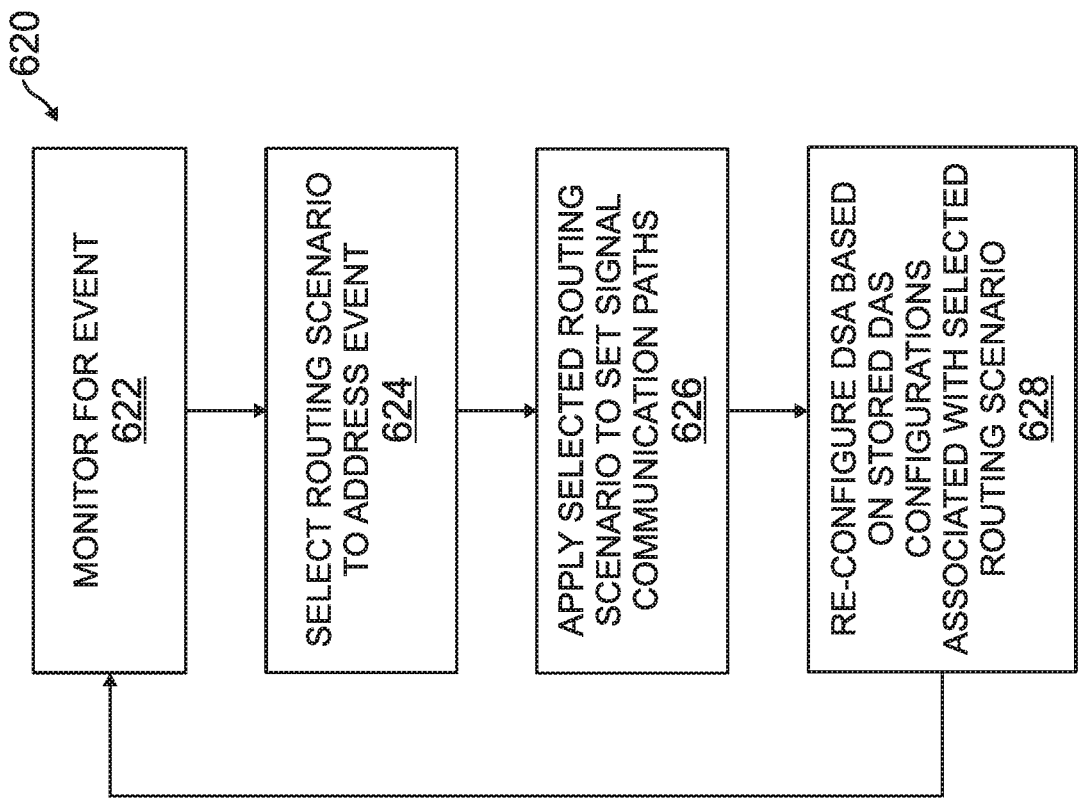
FIG. 7 illustrates a re-configuration flow diagram according to one exemplary embodiment.

Referring to FIG. 7, an example re-configuration flow diagram 620 of an exemplary embodiment is illustrated in FIG. 7. The blocks of the re-configuration flow diagram 620 have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner). In the example embodiment of FIG. 7, the process starts by monitoring for an event at block 622. As discussed above, the event may be manually triggered, scheduled or a triggered event. Moreover, in an embodiment, no active monitoring occurs, the system just passively waits for the event to be received. Once, an event has been received, a routing scenario is selected from the memory 504 at block 624. The selection of the routing scenario may be done manually with a system user input or it may be selected by a controller 502 instructed to apply the best routing scenario to address communication service capacity in at least one coverage zone. The signal communication paths are re-configured by switches, described above, based on the selected routing scenario at block 626. The DAS is re-configured based on stored DAS configurations associated with the selected routing scenario at block 628. The process then continues at block 622 monitoring for another event.

Example Embodiments

Example 1 is a re-configurable distributed antenna system. The re-configurable distributed antenna system includes a plurality of base transceiver stations, a plurality of remote antenna units, a signal router, at least one memory and at least one controller. Each base transceiver station is in communication with a core network of a communication provider. The plurality of the remote antenna units are configured and arranged to provide communication services for a plurality of coverage zones. The signal router is configured and arranged to selectively route signal communication paths between the plurality of base transceiver stations and the plurality of the remote antenna units. The at least one memory is configured to store routing scenarios and distributed antenna system configuration associated with the stored routing scenarios. Moreover, the at least one controller is configured and arranged to dynamically control the signal router to selectively route the signal communication paths between the plurality of base transceiver stations and the plurality of remote antenna units based at least in part on a then current need of communication service capacity within the plurality of coverage zones and the stored coverage routing scenarios.

Example 2, includes the re-configurable distributed antenna system of Example 1, wherein the at least one controller is further configured to use signal communication path properties in determining the distributed antenna system configurations.

Example 3 includes the re-configurable distributed antenna system of Example 2, wherein the signal communication path properties relate to at least one of gain settings, attenuation settings, output power profile definitions for the remote antenna units, analog filtering, digital filtering and delay adaptions.

Example 4 includes the re-configurable distributed antenna system of Example 2, wherein the signal communication path properties relate to leveling parameters in communication paths associated with the routing scenarios.

Example 5 includes the re-configurable distributed antenna system of any of the Examples 1-5, further including a plurality of point of interfaces and a plurality of transceivers. Each point of interface interfaces communication signals between a base transceiver station and the signal router. Each transceiver is communicatively coupled between a remote antenna unit and the signal router.

Example 6 includes the re-configurable distributed antenna system of any of the Examples 1-5, wherein the signal router further includes a plurality of switches to selectively route signal communication paths between the plurality of base transceiver stations and the plurality of the remote antenna units.

Example 7 includes the re-configurable distributed antenna system of Example 6, wherein at least one of the plurality of switches is one of an analog switch and a solid state switch.

Example 8 includes the re-configurable distributed antenna system of Example 6, wherein at least one of the plurality of switches is a radio frequency relay.

Example 9 includes the re-configurable distributed antenna system of any of the Examples 1-8, wherein the controller is further configured to initiate the dynamic routing of the signal communication paths by one of a manual signal, a scheduled event and a defined trigger event.

Example 10 is a method of operating a distributed antenna system. The method includes, dynamically switching signal communication paths between a plurality of base station transceivers and a plurality of remote antenna units and re-configuring the distributed antenna system with stored distributed antenna system configurations associated with the then current signal communication paths.

Example 11 includes the method of Example 10, wherein the switching of the signal communication paths is based at least in part on a selected routing scenario stored in the at least one memory.

Example 12 includes the method of any of the Examples 10-11, further including monitoring communication usage in coverage zones associated with each remote antenna units and switching the signal communication paths between the plurality of base station transceivers and the plurality of remote antenna units upon detection of a communication usage in at least one coverage zone that at least one of reaches a threshold and passes a threshold.

Example 13 includes the method of any of the Examples 10-12, further including manually triggering the switching of the signal communication paths.

Example 14 includes the method of any of the Examples 10-13, further including scheduling the switching of the signal communication paths.

Example 15 includes the method of any of the Examples 10-14, further including re-configuring the distributed antenna system so that radio frequency signals received from a base transceiver station of the plurality of base transceiver stations associated with the then current signal communication paths at a given power level are radiated at each associated remote antenna unit at a select power output level and that signals received by each associate remote antenna unit are received by the associated base station transceiver at a select power level.

Example 16, includes the method of any of the Examples 10-15, wherein the stored distributed antenna system configurations are based off of at least one of gain settings, attenuation settings, output power profile definitions for the remote antenna units, analog filtering, digital filtering and delay adaptions associated with the then current signal communication paths.

Example 17 includes the method of any of the Examples 10-16, wherein the stored distributed antenna system configurations based off of leveling parameters in the then current communication paths.

Example 18 includes a method of operating a distributed antenna system. The method includes providing a plurality of signal communication paths between a plurality of base transceiver stations and a plurality of remote antenna units. Each base transceiver station is in communication with a core network of a communication provider and each remote antenna unit provides communication services for a communication consumer coverage zone. A plurality of routing scenarios and distributed antenna system configurations are stored in at least one memory. Each distributed antenna system configuration enables communications through a signal communication path associated with a routing scenario. Upon detection of an event that indicates a need for enhanced communication service capacity at at least one coverage zone, a routing scenario is selected from the plurality of routing scenarios stored in the at least one memory to address the need for enhanced communication service capacity at the at least one coverage zone. At least one signal communication path is switched based on the selected routing scenario. The distributed antenna system is re-configured based on at least one distributed antenna system configuration stored in memory that is associated with the selected routing scenario.

Example 19 includes the method of Example 18, wherein the event is at least one of a manual signal, a scheduled event and a triggered event based on a monitored communication service level in a coverage zone.

Example 20 includes the method of any of the Examples 18-19, wherein the distributed antenna system configurations stored in memory relate to at least one of gain settings, attenuation settings, output power profile definitions for the remote antenna units, analog filtering, digital filtering and delay adaptions in associated signal communication paths.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A re-configurable distributed antenna system comprising:
   a plurality of base transceiver stations, each base transceiver station being in communication with a core network of a communication provider;
   a plurality of the remote antenna units configured and arranged to provide communication services for a plurality of coverage zones;
   a signal router configured and arranged to selectively route signal communication paths between the plurality of base transceiver stations and the plurality of the remote antenna units;
   at least one memory configured to store routing scenarios and distributed antenna configurations associated with the stored routing scenarios;
   at least one controller configured and arranged to dynamically control the signal router to selectively route the signal communication paths between the plurality of base transceiver stations and the plurality of remote antenna units based at least in part on a then current need of communication service capacity within the plurality of coverage zones and the stored coverage routing scenarios; and
   wherein the at least one controller is further configured to at least in part use signal communication path properties in determining the routing of signal communication paths between select base transceiver stations of the plurality of base transceiver stations and select remote antenna units of the plurality of remote antenna units associated with the distributed antenna system configurations, the signal communication path properties relating to at least one of gain settings, attenuation settings, output power profile definitions for the remote antenna units, analog filtering, digital filtering and delay adaptions.

2. The re-configurable distributed antenna system of claim 1, wherein the signal communication path properties further relate to leveling parameters in communication paths associated with the routing scenarios.

3. The re-configurable distributed antenna system of claim 1, further comprising:
   a plurality of point of interfaces, each point of interface interfacing communication signals between a base transceiver station and the signal router; and
   a plurality of transceivers, each transceiver communicatively coupled between a remote antenna unit and the signal router.

4. The re-configurable distributed antenna system of claim 1, wherein the signal router further comprises:
   a plurality of switches to selectively route signal communication paths between the plurality of base transceiver stations and the plurality of the remote antenna units.

5. The re-configurable distributed antenna system of claim 4, wherein at least one of the plurality of switches is one of an analog switch and a solid state switch.

6. The re-configurable distributed antenna system of claim 4, wherein at least one of the plurality of switches is a radio frequency relay.

7. The re-configurable distributed antenna system of claim 1, wherein the controller is further configured to initiate the dynamic routing of the signal communication paths by one of a manual signal, a scheduled event and a defined trigger event.

8. A method of operating a distributed antenna system comprising:
   dynamically switching signal communication paths between a plurality of base station transceivers and a plurality of remote antenna units;
   re-configuring the distributed antenna system with stored distributed antenna system configurations associated with the then current signal communication paths; and
   wherein the re-configuring of the distributed antenna system includes the routing of the signal communication paths between select base transceiver stations of the plurality of base transceiver stations and select remote antenna units of the plurality of remote antenna units using the stored distributed antenna system configurations that are at least in part based off of at least one of gain settings, attenuation settings, output power profile definitions for the remote antenna units, analog filtering, digital filtering and delay adaptions associated with the then current signal communication paths.

9. The method of claim 8, wherein the switching of the signal communication paths is based at least in part on a selected routing scenario stored in the at least one memory.

10. The method of claim 8, further comprising:
    monitoring communication usage in coverage zones associated with each remote antenna units; and
    switching the signal communication paths between the plurality of base station transceivers and the plurality of remote antenna units upon detection of a communication usage in at least one coverage zone that at least one of reaches a threshold and passes a threshold.

11. The method of claim 8, further comprising:
    manually triggering the switching of the signal communication paths.

12. The method of claim 8, further comprising:
    scheduling the switching of the signal communication paths.

13. The method of claim 8, wherein re-configuring the distributed antenna system further comprises:
    re-configuring the distributed antenna system so that radio frequency signals received from a base transceiver station of the plurality of base transceiver stations associated with the then current signal communication paths at a given power level are radiated at each associated remote antenna unit at a select power output level and that signals received by each associate remote antenna unit are received by the associated base station transceiver at a select power level.

14. The method of claim 8, wherein the stored distributed antenna system configurations based off of leveling parameters in the then current communication paths.

15. A method of operating a distributed antenna system comprising:
    providing a plurality of signal communication paths between a plurality of base transceiver stations and a plurality of remote antenna units, each base transceiver station in communication with a core network of a communication provider and each remote antenna unit providing communication services for a communication consumer coverage zone;

storing in at least one memory a plurality of routing scenarios and distributed antenna system configurations, each distributed antenna system configuration enabling communications through a signal communication path associated with a routing scenario;

upon detection of an event that indicates a need for enhanced communication service capacity at at least one coverage zone, selecting a routing scenario from the plurality of routing scenarios stored in the at least one memory to address the need for enhanced communication service capacity at the at least one coverage zone;

switching at least one signal communication path based on the selected routing scenario;

re-configuring the distributed antenna system based on at least one distributed antenna system configuration stored in memory that is associated with the selected routing scenario; and wherein re-configuring the distributed antenna system includes the routing of the signal communication paths between select base transceiver stations of the plurality of base transceiver stations and select remote antenna units of the plurality of remote antenna units using the distributed antenna system configurations stored in memory that at least in part relate to at least one of gain settings, attenuation settings, output power profile definitions for the remote antenna units, analog filtering, digital filtering and delay adaptions in associated signal communication paths.

16. The method of claim 15, wherein the event is at least one of a manual signal, a scheduled event and a triggered event based on a monitored communication service level in a coverage zone.

* * * * *